Figure 1:
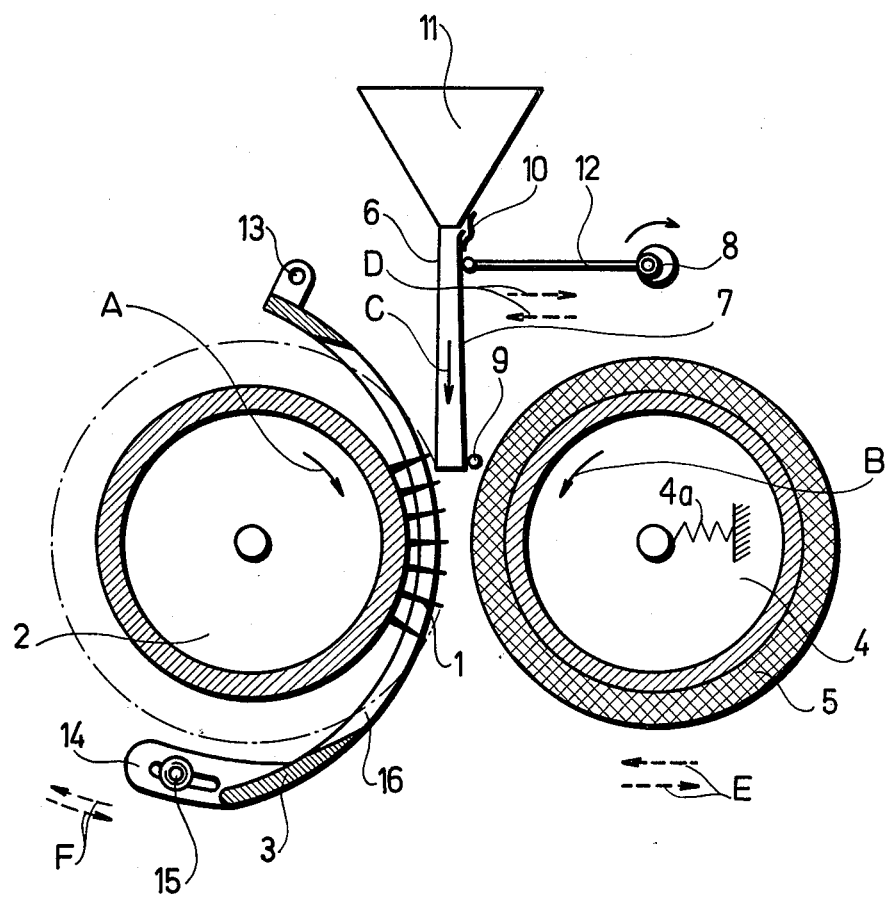

United States Patent [19]

Slezak

[11] B 3,988,976
[45] Nov. 2, 1976

[54] EQUIPMENT FOR THE IMPROVEMENT OF THE EFFICIENCY OF DRYING SHELLED MAIZE

[75] Inventor: Istvan Slezak, Perkata, Hungary

[73] Assignee: Intercooperation Kereskedelemfejlesztesi Rt., Budapest, Hungary

[22] Filed: Dec. 4, 1972

[21] Appl. No.: 311,450

[44] Published under the second Trial Voluntary Protest Program on March 9, 1976 as document No. B 311,450.

[30] Foreign Application Priority Data

Dec. 3, 1971   Hungary............................ SE 1598

[52] U.S. Cl.......................................... 99/485; 83/2; 99/507; 193/2 B; 198/693; 198/624; 198/626
[51] Int. Cl.²............................................ A23N 1/02
[58] Field of Search..................... 99/485, 506–507; 198/165; 193/2 B; 302/28, 59; 241/102, 227; 83/2

[56] References Cited
UNITED STATES PATENTS

| | | |
|---|---|---|
| 525,432 | 9/1894 | Spencer............................ 99/485 X |
| 574,470 | 1/1897 | Averell ..................................... 83/2 |
| 1,174,979 | 3/1916 | Heiderich........................... 193/2 B |
| 1,729,611 | 10/1929 | Forrest............................... 99/485 X |
| 1,735,406 | 11/1929 | Moore ..................................... 83/2 |
| 2,962,230 | 11/1960 | Dilley et al. .................... 241/102 X |
| 3,141,484 | 7/1964 | Lowe et al. ....................... 99/485 X |
| 3,196,913 | 7/1965 | Stahmer................................... 83/2 |
| 3,468,409 | 9/1969 | Ball..................................... 198/165 |
| 3,703,917 | 11/1972 | Mundy..................................... 83/2 |
| 3,760,666 | 9/1973 | Power et al...................... 99/485 X |

*Primary Examiner*—Richard C. Queisser
*Assistant Examiner*—Charles Gorenstein
*Attorney, Agent, or Firm*—Young & Thompson

[57] ABSTRACT

Kernel corn is dried by piercing the pericarp prior to drying. Apparatus for doing this comprises means to feed the kernels in uniformly oriented relation to a needle cylinder with a stripping comb. The kernels are resiliently pressed against the needle cylinder by a resilient surface which may be either on a cylinder or an endless belt. Orientation of the kernels may be effected either between that endless belt and another endless belt, or else in a vibrating chute.

3 Claims, 2 Drawing Figures

EQUIPMENT FOR THE IMPROVEMENT OF THE EFFICIENCY OF DRYING SHELLED MAIZE

The invention relates to equipment for the improvement of the efficiency of drying shelled maize.

It is known that various grain crops, for instance shelled maize, are dried in equipment working at high temperatures with air injection. With a view to the optimum utilization of the relatively expensive drying equipment drying times should be reduced to a minimum, that is to say, the drying process should be accelerated. At the present technical level with grain crops this can be theoretically achieved only by raising the working temperature and the velocity of the air flow. The increase of temperature is, however, limited by the behaviour of the material under high temperature; maize, for instance, will get burnt, malted — and the acceleration of the air stream becomes ineffective above a certain limit, the air leaving unsaturated, not to speak of excessive power consumption.

The method known in other technical fields, namely the increase of surface by breaking the material into small particles or grinding it in order to improve the efficiency of drying is impracticable with agricultural produce as the material gets smashed. As a result, the nutritive value of the produce would considerably drop even after a short storage, and powdery particles produced in the course of crushing would block up the grates of the drying apparatus in use today; high air velocity would result in significant loss of material etc. Beyond these technological problems the excessive power consumption of breaking up or grinding and the expenses of additional machinery would impose further disadvantages.

For the improvement of the efficiency of drying of some corn fodders, e.g. of clovers and lucerne, stalk crushers are applied. The stalks of lucerne dry slower than the leaves and therefore, to make drying time uniform the stalks are crushed between two breaking rollers. This process cannot be applied with grain crops; they have no parts that would dry at different rates, on the one hand, and the material would get crushed between the breaking rollers, on the other, the latter resulting in the drawback already mentioned.

The aim of the invention is to provide equipment that considerably improves the efficiency of drying shelled maize without the need of crushing the grains.

The invention is based in the idea that the surfaces of shelled maize are covered by outer layers that significantly hinder the evaporation of moisture contained in the cores of the grains, protracting the drying process by this.

The aim of the invention can be attained that the continuity of the outer layer covering the surfaces of the grains to be dried and hindering the escape of the moisture is broken at least at one place, before and/or during the drying process, preferably by piercing and/or cutting through the said layer.

The equipment has a damaging device having appliances suitable to break the continuity of the layers covering the grains, such as needles, knives or similar appliances; a pressure device that forces the grains against the said appliances; a feeding device to feed the grains between the damaging device and the pressure device; and a take-off device which, after the continuity of the layers has been broken, directly or indirectly removes the grains from the appliances breaking the continuity.

The essence of a preferable implementation of the equipment is that the damaging device consists of a needle cylinder, and the pressure device consists of a pressure cylinder, the take-off device for removing the grains being a stripping comb arranged in front of the needle cylinder and having grooves to let the needles of the needle cylinder through, while the needle cylinder and pressure cylinder are rotating in opposite directions.

According to another feature of the invention the pressure cylinder is covered with a resilient layer, advantageously a rubber layer.

It might be expedient that the pressure cylinder is adjustable in a plane that intersects the axis of the needle cylinder and that of the pressure cylinder. This latter may be spring-mounted.

Preferably the equipment may be provided with means permitting the adjustment of the distance of the stripping comb with respect to the mantle of the needle cylinder and the adjustment of the projection of the needles beyond the outlines of the comb, preferably by a link and a clamping screw.

The feeding device is designed so that it forwards the grains in an ordered way, e.g. maize lying on one of the wide flat sides. In accordance with another aspect of the invention the feeding device consists of a feed chute connected to the charging hopper and directed towards the gap between the needle cylinder and pressure cylinder, one of its sides being designed as a vibrating plate. In this case the vibrating plate by its hopper-side is jointed to an eccentric pin through an eccentric rod of adjustable length and on the cylinder-side end, it is rotatably fixed to a pin, and has direct connection to the hopper through a flexible fabric extension.

According to another embodiment of the equipment described above, the feeding device consists of a belt conveyor and a pressing belt placed above said belt conveyor and parallel with it, the crops lying upon one of their large faces being conveyed between said belt conveyor and pressing belt into the gap between the needle cylinder and pressure cylinder, said belt conveyor and pressing belt being rotated in opposite directions, In this case, the resilient layer of the pressure cylinder is formed by the covering of the belt conveyor, said pressure cylinder serving as the driving cylinder for said belt conveyor.

The invention solves a problem practically unsolved until now in this field and by the improving of the efficiency of drying, by the cutting down of the drying time by 20–35 per cent, it considerably improves the performance of the drying equipment. The material treated does not undergo any significant deformation, there is no pulverization loss, neither is there any loss in nutritive value during storage. The equipment is of simple construction and of low power consumption since no significant deformation is to be performed.

The invention will be discussed in detail on the basis of the accompanying drawing, containing some embodiments of the equipment for carrying out the procedure, specifically designed for the treatment of shelled maize. In the accompanying drawings.

Figure 2:
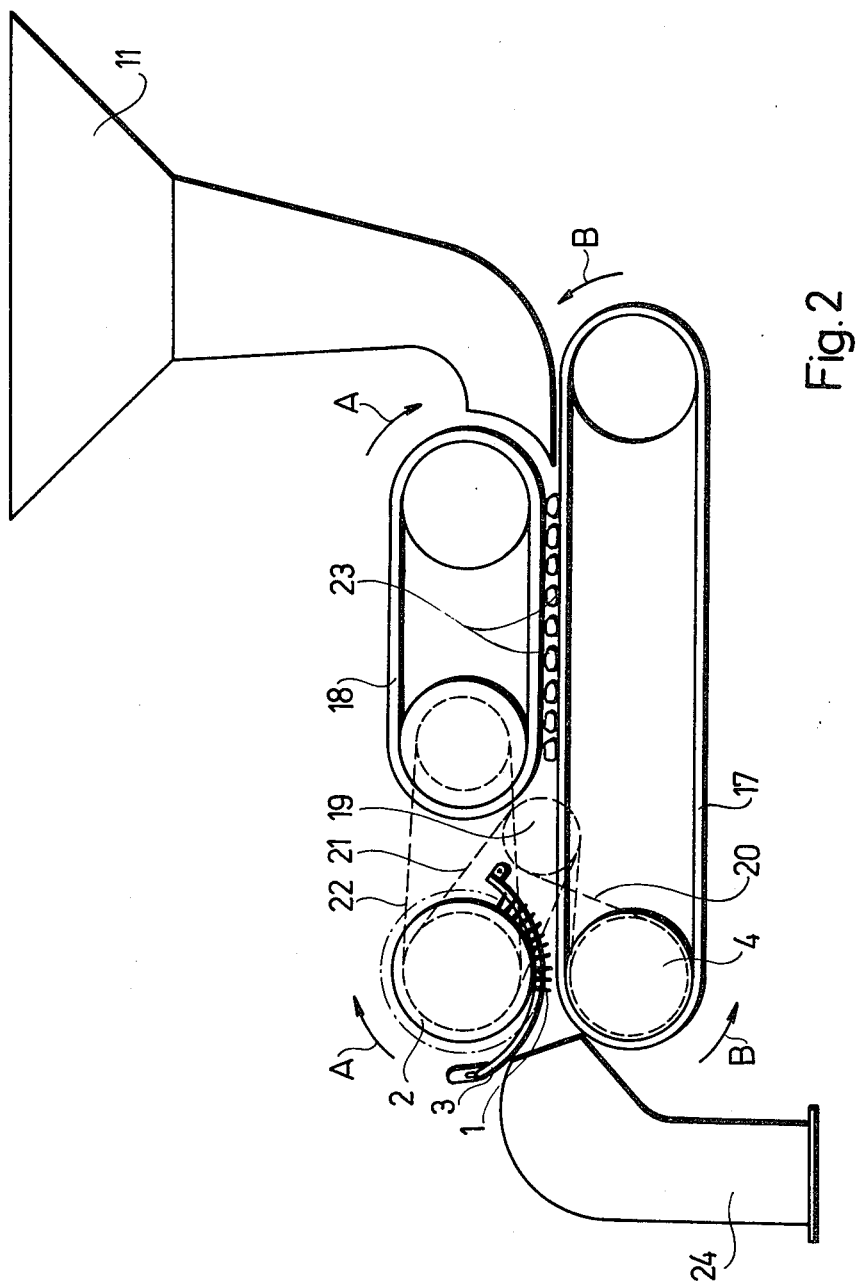

FIG. 1 represents a longitudinal section of equipment according to the invention, FIG. 2 shows a longitudinal section of an embodiment of the equipment shown in FIG. 1.

The equipment has two parallel cylinders facing each other and rotating in opposite directions, a needle cylinder 2 and a pressure cylinder 4. The needle cylinder 2 has radial needles densely arranged in planes parallel to the end faces of cylinder 2. Pressure cylinder is covered by rubber coat 5 and to make possible the adaptation to the grain size of the crop to be treated, it is adjustable in the horizontal plane intersecting the axis of the pressure cylinder and is urged toward cylinder 2 by springs 4a.

Stripping comb 3 is placed between cylinders 2 and 4, its function being to pull off the grains stuck on the needles. Stripping comb 3 is likewise adjustable so as to permit the adjustment of the depth of pricking.

Shelled maize is forwarded between cylinders 2 and 4 by feed chute 6 that joins the charging hopper 11, the chute extending between the two cylinders. One of the long sides of the feed chute 6 is designed as a vibrating plate 7 which is mounted in bearings at pin 9, and the opposite end on the hopper side 11 is connected through flexible fabric extension piece 10 to the hopper, on the one hand, and through eccentric rod 12 of adjustable length to eccentric pin 8, on the other. The function of vibrating plate 7 is to ensure the steady feed of the maize and the arrangement of the grains in a way that they enter between cylinders 2 and 4 with their largest surfaces.

On the ends — the upper one in FIG. 1 — of the stripping comb 3 is mounted swingably around pin 13, while the other end can be adjustably fixed by means of link 14 and clamping screw 15. The width of the stripping comb 3 corresponds to that of cylinders 2, 4, the needles 1 of needle cylinder 2 reaching into the slots 16 of the comb, wherefrom they project towards cylinder 4 to the desired extent, without, however, reaching the cylinder.

The arrows in broken lines indicate the possible directions of adjustment of the eccentric rod and of the pressure cylinder.

With the equipment according to the invention the procedure is carried out as follows:

Shelled maize is cleaned and conveyed to hopper 11 wherefrom the grains pass into feed chute 6 by gravity. Vibrating plate 7 arranges the grains in a way such that they turn their largest faces in the plane of vibrating plate 7.

In this position the grains pass between needle cylinder 2 and pressure cylinder 4, the two cylinders rotating in opposite directions, identical with the direction of motion of the grains under the effect of gravity.

Needles 1 of cylinder 2 rotating gradually enter into slots 16 of stripping comb 3, and pressure cylinder 4 forces the grains against the needles that pierce the aforesaid surface layer at least at one point, thus breaking the continuity of the covering layer and permitting the prompt escape of moisture from the cores of the grains in the course of the drying operation. After that as the cylinders go on rotating needles 1 gradually come apart from stripping comb 3, leave slots 16 into which the grains stuck on needles 1 cannot go and the grains are stripped from the needles, that is to say, the needles are pulled out of the grains, the latter fall down and can be forwarded to the drying equipment.

The resilient cover of pressure cylinder 4, rubber coat 5 is for the equalizing of differences in grain sizes. The distance of the outer profile of the resilient coat of pressure cylinder 4, i.e. rubber coat 5, to the points of needles 1 is adjusted so that in normal position it corresponds to the thickness of the smallest grains occurring in the produce, which means that the needles will safely prick also the smallest grains. Bigger grains get pressed into the rubber coat 5 so that the needles enter into them to the same depth as in the case before. It goes without saying that the resilient pressure must not result in the smashing of the grains.

The adjustment facilities mentioned above and indicated by the arrows in broken lines in FIG. 1 permit the equipment to be adjusted as required to suit the grain size of the produce in hand (cereals, industrial plants, maize etc.), and the gap between the two cylinders can be selected accordingly.

Naturally, the equipment according to the invention is by no means restricted to the example of embodiment presented in detail above, and can be implemented in a number of variants within the sphere of protection defined by the claims below. For instance, it may be advantageous to construct the equipment in a horizontal layout instead of an upright one, in which — the structural design remaining unchanged — the needle cylinder with the stripping comb are placed on top and the pressure cylinder with its resilient coating under it. This embodiment is shown in FIG. 2. The maize crops 23 are fed to the needles 1 of the needle cylinder 2 by a feeding device consisting of the belt conveyor 17 and the pressing belt 18. The maize crops lie between said belt conveyor 17 and pressing belt 18 upon none of their large faces. The gap between the belt conveyor 17 and pressing belt 18 is a little smaller than the thickness of the smallest maize crop. The belt conveyor 17 and pressing belt 18 are circulated in opposite directions A and B. The resilient layer of the pressure cylinder 4 is formed by the covering of said belt conveyor 17, and the pressure cylinder 4 serves as the driving cylinder of the belt conveyor 17. In this case, only the belt pulley 19 is driven by a (not shown) motor; from the belt pulley, the cylinders 4 and 2 are driven by drive belts 20 and 22, respectively. In this way, the belt conveyor 17 is driven, too. The pressing belt 18 is driven by the drive belt 22. The pierced maize crops 24 leave the equipment through the pipe 24. All the other parts of the equipment are the same as shown in FIG. 1 and explained in connection with FIG. 1, consequently the same reference numerals have been used. Thus maize is fed between the two cylinders by a horizontal endless belt conveyor facing the gap between the two cylinders, the maize being forwarded to it from a hopper also here. To arrange the grains a pressure device in the form of a smaller endless belt placed above the belt conveyor at a short distance may be used.

Alternatively, in principle also two needle cylinders rotating in opposite directions could be applied, the needles interfingering. A solution in which a flat needle carrier and pressure face are applied is also feasible, in which case, however, the necessity of higher machine input and of intermittent operation should be considered. Of course, in such eventuality also a stripping device different from the stripping comb discussed above should be designed.

Besides grain crops, such as cereals, maize etc. the application of the invention may be extended to other similar produce, for instance, to some fruits, etc. The improvement of the efficiency of drying of the crops of some industrial plants by the method according to the invention may equally prove advantageous.

What we claim is:

1. Equipment for drying grains of shelled maize, comprising a pair of cylinders rotating in opposite directions about parallel axes, a multiplicity of needles extending radially outwardly from the cylindrical surface of one said cylinder toward but spaced from the cylindrical surface of the other said cylinder, the surface of said other cylinder being resilient, a stripping comb for removing grains of maize from said needles, and means for orienting grains of shelled maize so that their flat sides are substantially parallel to said axes and for feeding thus oriented grains of maize between said cylinders, said orienting and feeding means comprising a hopper that feeds to a chute that is closed on all sides, and means for vibrating one wall of said chute to orient said grains, the wall of said chute opposite said vibrating wall being stationary.

2. Equipment as claimed in claim 1, said vibrating wall being connected to an eccentric rotating pin through a rod connected to the wall, one end of the wall being pivotally mounted and the other end of the wall being connected with the hopper by a flexible extension piece.

3. Equipment for drying grains of shelled maize, comprising a pair of cylinders rotating in opposite directions about parallel axes, a multiplicity of needles extending radially outwardly from the cylindrical surface of one said cylinder toward but spaced from the cylindrical surface of the other said cylinder, the surface of said other cylinder being resilient, a stripping comb for removing grains of maize from said needles, and means for orienting grains of shelled maize so that their flat sides are substantially parallel to said axes and for feeding thus oriented grains of maize between said cylinders, said orienting and feeding means comprising a pair of opposed coacting endless belts between which said grains are fed between said cylinders, one of said endless belts being longer than the other of said endless belts and extending about said other cylinder.

* * * * *